US005630894A

United States Patent [19]

Koch et al.

[11] Patent Number: 5,630,894

[45] Date of Patent: May 20, 1997

[54] FLEXIBLE HEATING PAD FOR TRANSFER OF DECALCOMANIA

[75] Inventors: Esther A. Koch, Valley; Jimmie M. Craig, Newport, both of Wash.

[73] Assignee: Gemstone Memorials, Inc., Valley, Wash.

[21] Appl. No.: 393,224

[22] Filed: Feb. 23, 1995

[51] Int. Cl.$^6$ .................. B32B 31/00

[52] U.S. Cl. .................. 156/64; 156/286; 156/359; 156/366; 156/475; 156/493; 156/583.3

[58] Field of Search .................. 156/64, 230, 285, 156/286, 359, 366, 475, 493, 583.1, 583.3; 100/93 P, 211

[56] References Cited

U.S. PATENT DOCUMENTS

| | | | |
|---|---|---|---|
| 1,782,852 | 11/1930 | Jeffray | 100/90 |
| 2,065,957 | 12/1936 | Wrange | 216/54 |
| 2,305,553 | 12/1942 | Orswell | 156/493 |
| 2,489,643 | 11/1949 | Hunter | 219/19 |
| 3,206,347 | 9/1965 | Holstein | 156/476 |
| 3,434,910 | 3/1969 | Kannegiesser et al. | 156/583 |
| 3,554,834 | 1/1971 | Bennett et al. | 156/230 |
| 3,818,823 | 6/1974 | Bond | 100/93 P |
| 3,837,965 | 9/1974 | Mahon et al. | 156/382 |
| 3,950,210 | 4/1976 | Gibbs et al. | 156/367 |
| 4,379,018 | 4/1983 | Griesdorn | 156/359 |
| 4,874,454 | 10/1989 | Talalay et al. | 156/359 |
| 5,019,193 | 5/1991 | Aramini | 156/64 |
| 5,108,532 | 4/1992 | Thein et al. | 156/285 |
| 5,252,171 | 12/1993 | Anderson et al. | 156/358 |
| 5,300,170 | 4/1994 | Donohoe | 156/493 X |

*Primary Examiner*—David A. Simmons
*Assistant Examiner*—Paul M. Rivard
*Attorney, Agent, or Firm*—R. Reams Goodloe, Jr.

[57] ABSTRACT

A flexible heating and vacuum pad sealer. The heating/vacuum pad is used to hold heat sensitive decalcomania between the pad and the substrate for application of a decal to the substrate by heat and pressure. The sealer is normally used in combination with a reverse image type sublimation decal system to facilitate application of decals to solid objects such as urns or monuments. The heating pad includes a manifold portion having passageways for drawing a vacuum, a heating pad body portion having heating elements embedded therein, a porous lower compliant skin portion to contact the decal being applied, and a peripheral sealing lip. The heating elements and vacuum are interconnected with a control box. The control box includes a timer for controlling the vacuum pump, and heater temperature controls responsive to the measured temperature of the heating pad, in order to maintain a predetermined temperature for a predetermined time period so that the decal may be effectively but safely transferred without overheating.

18 Claims, 4 Drawing Sheets

FLEXIBLE HEATING PAD FOR TRANSFER OF DECALCOMANIA

TECHNICAL FIELD OF THE INVENTION

This invention relates to a novel, improved device for applying heat sensitive decals to objects. Devices of that character are particularly useful for the application of sublimation type decals to solid objects.

BACKGROUND OF THE INVENTION

The application of heat sensitive decalcomania (usually referred to simply as "decals") to selected substrata is well known. In particular, the use of reverse image sublimation type decals has grown in recent years, and it has become desirable to use such decals to place designs and photographs on solid objects. Devices heretofore utilized have been primarily, if not exclusively, for application of such decals to (a) planar objects, or (b) to objects which have non-planar surfaces primarily along a single axis, such as cylindrically shaped simple coffee cups.

However, in two important circumstances, the drawbacks of the existing devices known to us has become apparent. First, with respect to objects which are cylindrical, heretofore a separate device has been required to apply transfers to each unique radius of curvature. This is because such devices have been either built to substantially accommodate only one surface, or, have been built without sufficient provision for gas escapement in the pressure forming pad to allow escapement of all trapped gases as the device is secured against a curved surface. Second, most devices have been of the type wherein an object to which a decal is to be applied must be brought to the decal application device, rather than of the type where the device itself can be taken to a remote location for application of a decal to an object. Therefore, a continuing demand exists for a simple, inexpensive device which can be used to apply heat and pressure to heat sensitive decals in order to reliably transfer such decals to various curvelinear substrates.

Prior art devices of which we are aware and which suffer from one or more of the infirmities as described above are disclosed in U.S. Pat. No. 3,818,823 issued Jun, 25, 1974, to Bond for HEATED VACUUM PRESSURE PRESS; U.S Pat. No. 3,837,965 issued Sep. 24, 1974, to Mahon et al for PORTABLE REPAIR APPARATUS; U.S. Pat. No. 4,379,018 issued Apr. 5, 1983 to Griesdorn for HEAT TRANSFER APPARATUS; U.S. Pat. No. 4,874,454 issued Oct. 17, 1989 to Talalay et al. for DECAL TRANSFER DEVICE; and U.S. Pat. No. 5,019,193 issued May 28, 1991 to Aramini for ARRANGEMENT FOR AND METHOD OF APPLYING HEAT-TRANSFERRABLE DECALCOMANIA TO MUGS.

For the most part, the patent documents identified in the preceding paragraph disclose devices which are relatively fixed machines. Although the patent issued to Mahon superficially resembles the present invention, upon detailed examination it is clear that the Mahon et al vacuum pad/press lacks the interior structure which we have found advisable in order to form a wrinkle free bond on curved substrates.

Another common deficiency of the heretofore available heating pads for is the absence of a readily apparent visual indication to the operator of the progress and status of the decal application process, such as the time remaining until the decal application process is considered complete. The advantage of such an indication is important and self-evident.

SUMMARY OF THE INVENTION

We have now invented, and disclose herein, a novel, improved vacuum/heating pad for transfer of decalcomania which does not have the above-discussed drawbacks common to those heretofore used decal transfer devices of which we are aware. Unlike many decalcomania transfer devices heretofore available, our heating pad is simple, compact, relatively inexpensive, light, easy to use at remote locations on immovable objects, and is otherwise superior to the heretofore used or proposed devices.

Our novel vacuum/heating pad differs from those devices mentioned above in one respect in that it has an air flow passageway portion which is used to provide uniform vacuum to the interior chamber formed when the device is used against a substrate. As a consequence the device can be employed on objects of varying shapes and radii, particularly those with cylindrical surfaces.

We have now developed a novel vacuum/heating pad device for use in the application of heat and pressure to a heat sensitive and transferable decal in order to apply the decal to a substrate. The apparatus includes heating pad, with the heating pad further including a body which has a first portion having an exterior upper side, a second portion having a lower interior side, and a peripheral edge portion. A compliant porous skin portion is provided adjacent to the lower interior side; this skin portion is the part which applies pressure to the decal being applied to the substrate. An electric resistance heater is integrally formed within the second portion of the body. An annular, peripheral sealing lip of deformable, preferably silicon rubber material is located adjacent to the peripheral edge portion. The sealing lip is adapted to provide sidewalls to form a seal between the heating pad and a substrate, and to thereby form a chamber between the substrate and the lower interior side of the second portion of the body. Passageways are also located in the body; these passageways provide an exit where the air trapped in the chamber can escape when a vacuum is drawn on the exit of the passageways. A vacuum pump is provided to draw a vacuum on the exit of the passageways, so that air can be evacuated from the chamber between the heating pad and the substrate. The passageways are in fluid communication with the compliant porous skin portion. When the vacuum pump is engaged, air is withdrawn through the porous skin portion and thence into the passageways and thence to the vacuum pump. A vacuum is evenly established to urge the porous skin portion of the heating pad against a transferrable decal, and in turn urge the decal against the substrate. Thus pressure is evenly applied to the decal by the porous skin portion, so that wrinkles in the decal may be avoided.

In those cases where a selected substrate is curved, our heating pad is particularly useful. Our heating pad is flexible so that when it is brought into operative proximity to a selected substrate, the heating pad deforms so that the heating pad compliantly conforms substantially to the shape of such substrate.

OBJECTS, ADVANTAGES, AND FEATURES OF THE INVENTION

From the foregoing, it will be apparent to the reader that one important and primary object of the present invention resides in the provision of a novel, improved apparatus and method for heating decals and for pressing them against solid objects for application thereto. The device is particularly desirable in the application of certain types of decals, such as sublimation type decals, on complex curvelinear objects.

Other important but more specific objects of the invention reside in the provision of a flexible, vacuum/heating sealer as described in the preceding paragraph which:

allow the application of a decal to a wide variety of objects ranging from a flat to curved to be done in a simple, one step manner;

is relatively simple to operate;

is extremely lightweight, and therefore easily portable;

in conjunction with the preceding object, has the advantage that it can be used at any convenient location for ease of application to immovable objects;

provides a visual indication of the temperature of the heating device, by simple observation, to the operator while the sealing operation is being conducted;

is relatively inexpensive; and includes a sealing lip on the flexible heating pad which allows the formation of a vacuum chamber between the heating pad and a substrate by a vacuum forming device, to heat and to strongly urge a decal against a solid object, thereby allowing the decal to become affixed to the object.

Other important objects, features, and additional advantages of my invention will become apparent to the reader from the foregoing and from the appended claims, and as the ensuing detailed description and discussion proceeds in conjunction with the accompanying drawing.

DETAILED DESCRIPTION OF THE INVENTION

Figure 1:
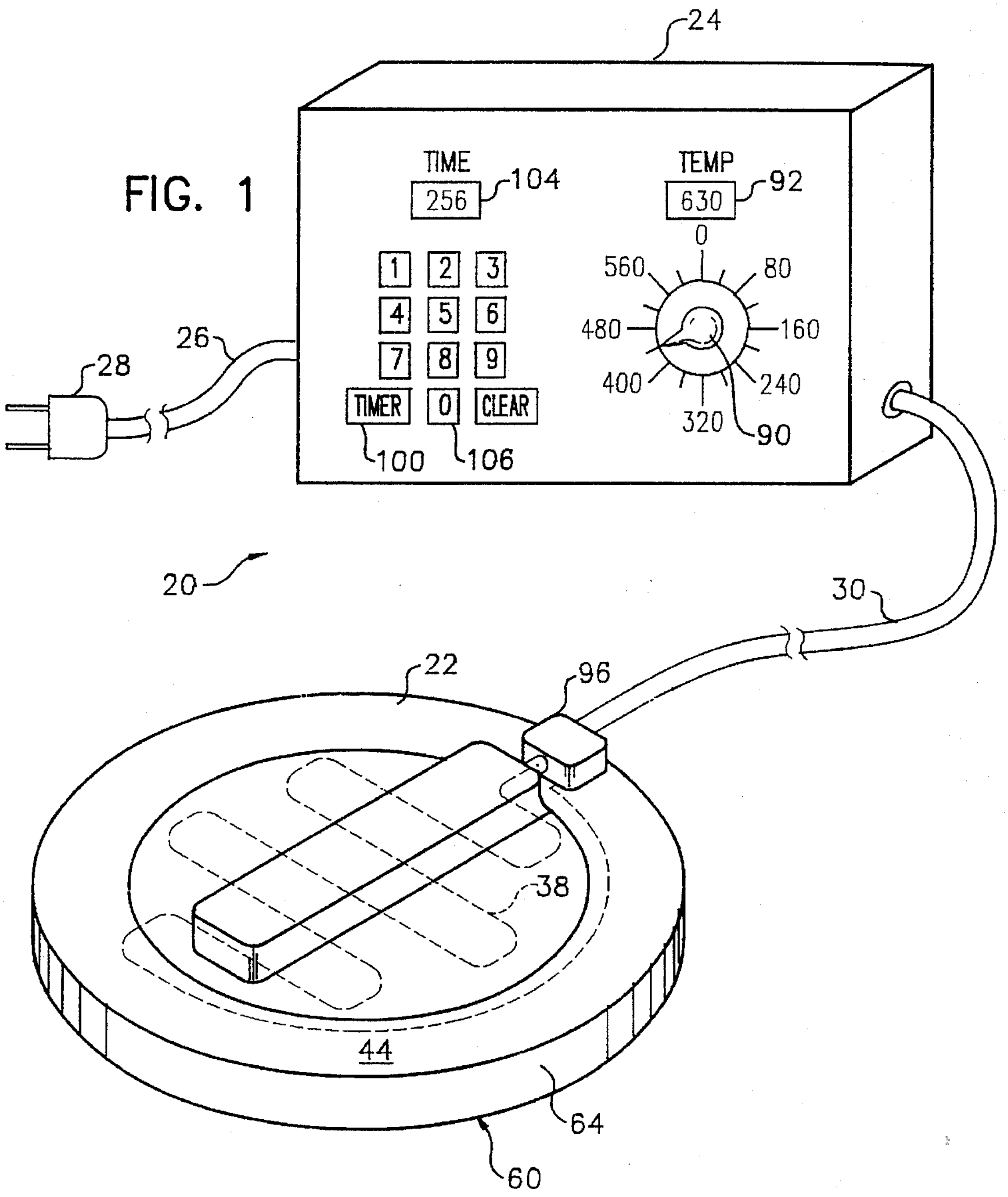
FIG. 1 is a perspective view of the flexible heating pad sealer constructed in accord with the principles of the present invention, showing the heating pad, the control box, and the combination vacuum and electrical lines running to the flexible heating pad.

Referring now to the drawing, FIG. 1 depicts, in its operative position, a decal application device 20 constructed in accord with, and embodying, the principles of the present invention.

Figure 2:
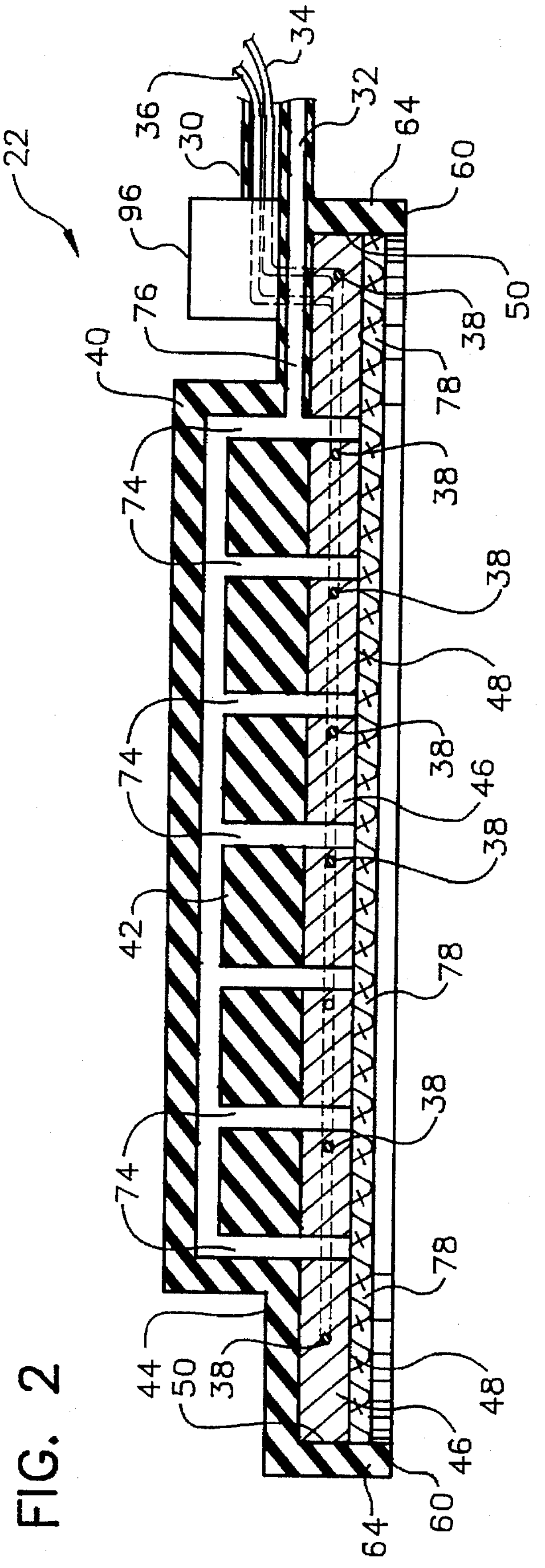
FIG. 2 is a vertical cross sectional view of the flexible heating pad sealer constructed in accordance with the teachings of the present invention, shown as if in position ready for use on a flat substrate.

As can be seen from FIG. 1 and FIG. 2, major components of the decal application device 20 include: a flexible heating pad 22, a control box 24 with electrical power supply line 26, with plug 28, and a connection cable 30 running between the control box 24 and the heating pad 22. The connection cable includes a vacuum line portion 32 and electrical power supply lines 34 and 36 for the electrical resistance heater elements 38 which are embedded within heating pad 22. The connection cable 30 is preferably six to eight feet long, at a minimum, to enable use of the device 20 to put a decal on a wall or cabinet, for example, in place, rather than having to remove the cabinet doors and send it to a machine at a remote location. This capability is also useful for objects that are too large to place into conventional decal application machines. We prefer using heating pads 22 which are provided with about 10 watts of resistance heating per square inch, based on a flat measurement of heating pad 22.

Heating pad 22 further includes a body 40; the body 40 has a first portion 42 having an exterior upper side 44, and a second portion 46 having a lower interior side 48, and a peripheral edge portion 50. Preferably, the electric resistance heater elements 38 are integrally formed within the second portion 46 of the body 40. This may be accomplished by using high temperature resistant silicon rubber molding techniques.

Figure 3:
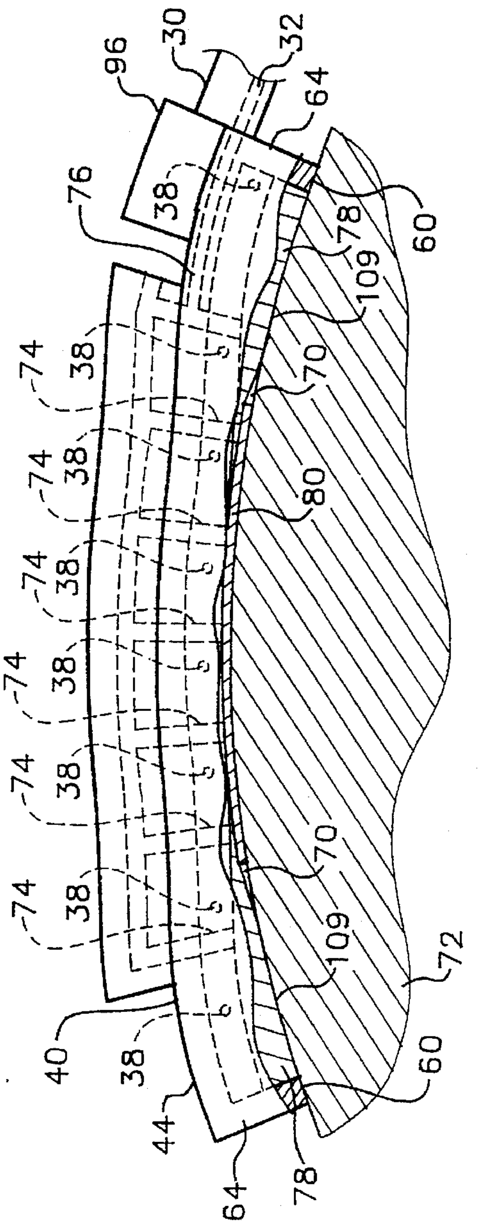
FIG. 3 is a side view with partial vertical cross-section showing the flexible heating pad sealer first set forth in FIG. 2 in operating position over a solid, cylindrical object while applying a decal.

A peripheral sealing lip 60 is also provided in a deformable material such as silicon rubber. The sealing lip 60 is located adjacent to the peripheral edge portion 50 of the body 40, and is adapted to provide a sidewall 64 structure. As can be seen in FIG. 3, the sidewall 64 structure acts in conjunction with the sealing lip 60 and the lower interior side 48 of the second portion 46 of the body 40 to form a chamber 70 between the heating pad 22 and a substrate 72.

There are one or more passageways 74 in the second portion 46 of body 22. The passageways 74 are adapted to allow air or other gases to move through the passageways 74 to thereby escape from the chamber 70 when a vacuum is drawn on the chamber 70 by withdrawing air through the exit 76 of the passageways 74.

A compliant porous skin portion 78 is provided adjacent to the lower interior side 48 of the body 40 of heater 22. This porous skin portion 78 is important because it allows uniform escapement of air above a decal 80 which is being heated for application to substrate 72. The porous skin portion 78 also protects the decal from the heating pad. Thus, undesirable wrinkling and deformation of the decal carrier 80 and/or decal 81 is avoided.

Figure 5:
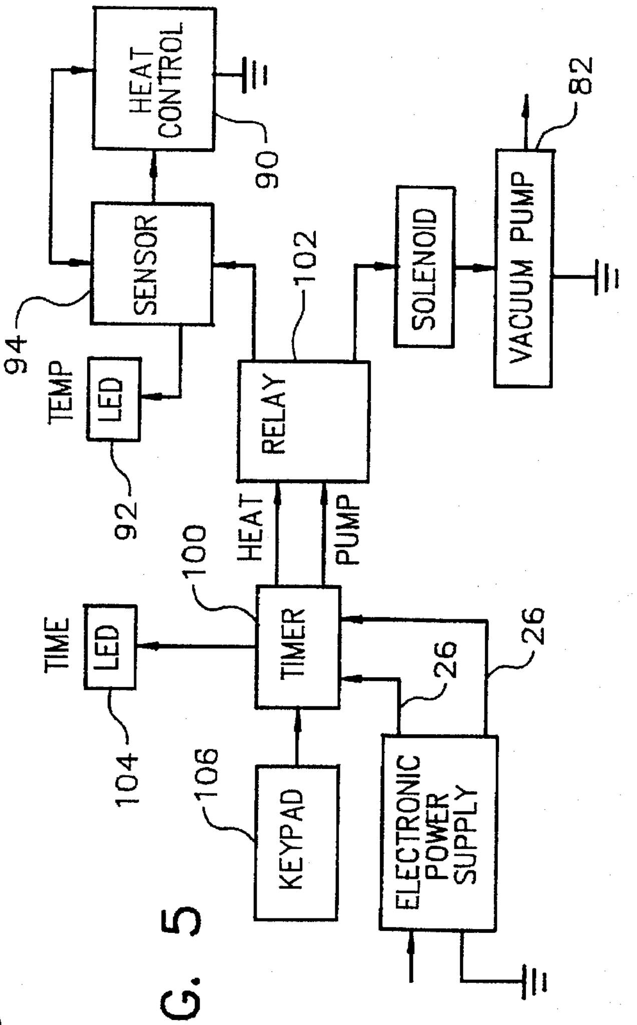
FIG. 5 is a block diagram showing the functional control logic used in the flexible sealer operating cycle.

A vacuum pump 82 (see FIG. 5) is provided to draw a vacuum by withdrawing air through exit 76 and vacuum line 32. When the vacuum is created in the chamber 70 between the heating pad 22 and the substrate 72, the porous skin portion 78 is urged against the decal carrier 80, and both skin portion 78 and decal carrier 80 are urged against the substrate 72. With normal vacuum operation in the range of 15 inches of mercury to 19 inches of mercury, the decal carrier 80 is strongly pressed against substrate 72.

Returning now to FIG. 1, the control box 24 further includes a temperature controller 90, with visual temperature readout 92 such as a light emitting diode type device. The controller 90 is set up to receive an indication from a temperature sensor 94, such as a thermocouple 96, and in response thereto limit the electrical input to the electric resistance heater elements 38 and to thereby regulate the temperature of said heating pad 22. Control box 24 also includes a timer 100 which is set up to send a signal to a heater control relay 102 to thereby start and stop electrical energy input to the vacuum pump 82. The timer 100 also has a visual display device 104 such as a light emitting diode for visually displaying the remaining time for application of a vacuum. Timer 100 includes a ten-key type keypad 106 or other convenient means which is adapted to provide input to the timer 100 to preselect a period of time for operation of the vacuum pump 82.

Figure 4:
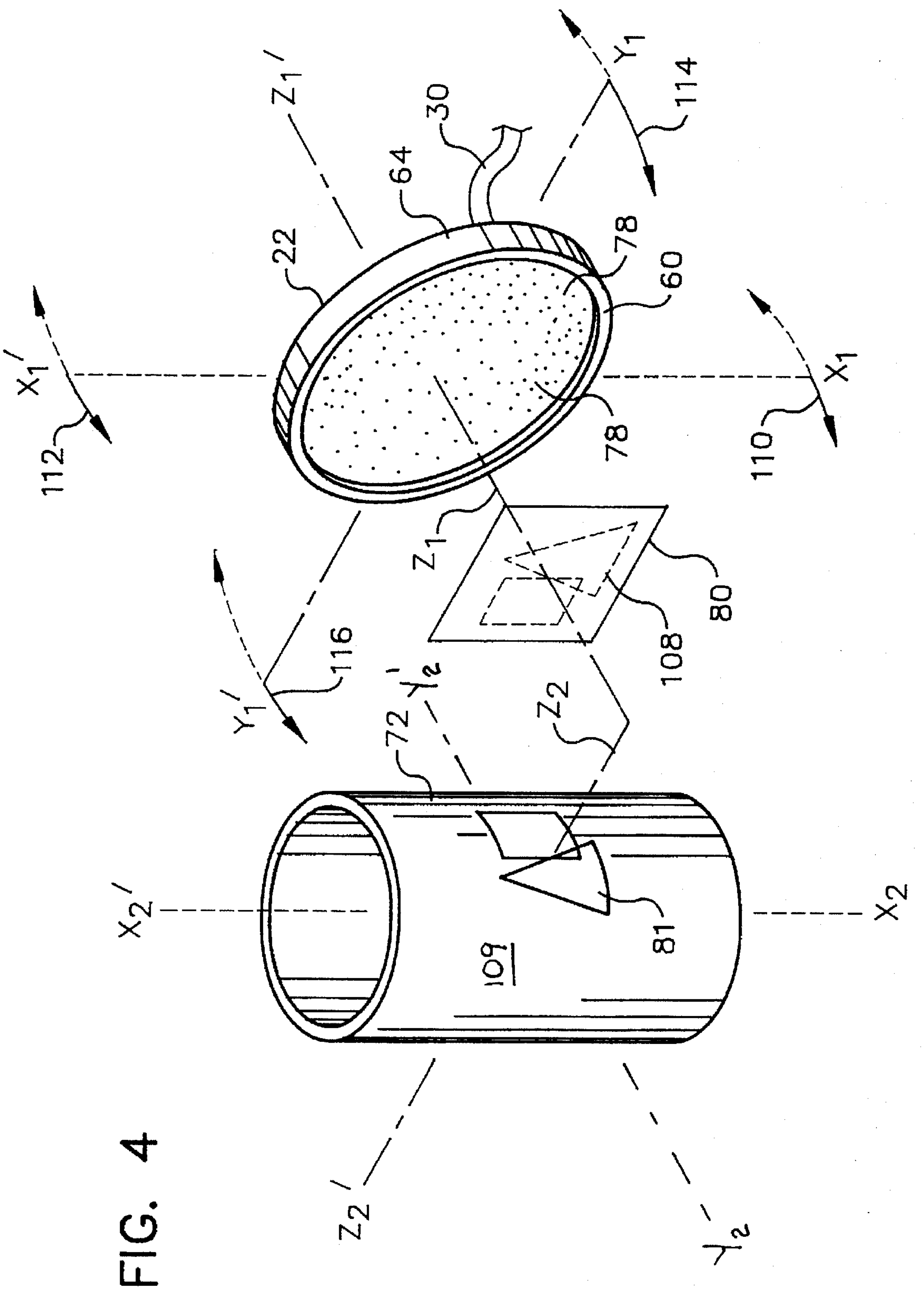
FIG. 4 is a perspective view of the heating pad portion of the flexible sealer constructed in accord with the principles of the present invention, showing the how the sealer is flexible for application of a decal to a curved surface of any object, and also showing application of a reverse type sublimation decal to the object.

A principal advantage of our heating pad device 22 is that it is deformable over a range of more than one radii. This is illustrated in FIG. 4, wherein a preselected substrate 72 is shown in the form of a cylindrical urn. A reverse image type decal 108 is provided on decal carrier 80 suitable for transfer, in order to form a positive image decal 81 on the substrate 72. The heating pad 22 is compressed against decal carrier 81 and both are compressed against the substrate 72 in the manner depicted in FIG. 3.

However, it is clear that the surface 109 of substrate 72 presents a cylindrical surface with a major axis $X_2$–$X_2$', and symetrical dimensions along minor axes in the $Y_2$–$Y_2$' and $Z_2$–$Z_2$' directions. Heating pad 22 is sufficiently flexible such that when brought into operative proximity to the substrate 72, the heating pad is deformable along the axis $Y_1$–$Y_1$' with respect to a dimension in the $Z_1$–$Z_1$' direction to an extent comparable to the curvelinear shape of substrate 72 along axis $Y_2$–$Y_2$' with respect a dimension in the $Z_2$–$Z_2$' direction, (as indicated by reference arrows 114 and 116) so that the heating pad 22 compliantly conforms substantially to the shape of the substrate 72. Where, as shown, heating pad 22 is provided in a substantially circular disk shape, the pad 22 of appropriate size (preselected to match the expected size requirements of decal 81 and substrate 72) is able to deform as needed to accommodate the curvature of the substrate 72. This is an important advantage of our invention. The exact shape of heating pad 22 may also be varied by providing the same in, for example, a rectangular or other suitable shape. The exact thickness of the heating pad 22 may also be varied as required to meet the heating requirements and the flexibility requirements for a particular set of service applications.

From the above description of our new apparatus, a method for the application of heat and pressure to a heat sensitive transferable decal 81 to apply the same to a substrate 72 may be clearly understood. The method involves heating a decal carrier (having decal 81 thereon) 80 with a heating pad 22 as described above, for a predetermined time period, with the heating pad 22 compressing the decal carrier 80 against the substrate 72. Simultaneous with the heating step, a vacuum is drawn on the chamber 70 with a vacuum pump 82, whereby air is evacuated through the passageways 74, so as to urge the porous skin portion 78 of the heating pad 22 against the transferrable decal 81, and in turn urge the decal carrier 81 and decal 80 against the substrate 72.

Broadly, the working temperature for the heating pad 22 is between 300 degrees Fahrenheit and 550 degrees Fahrenheit. The actual temperature chosen will depend upon the sublimation decal material being utilized, as well as the material comprising a particular substrate 72. For example, some substrates require higher temperatures, e.g., metal, including brass, and ceramic tiles normally have decals applied with a heating pad 22 temperature normally in the range of 375° F. to 4000° F. On the other hand, application of decals to wood is normally done at a temperature between 2000° F to 2500° F.

Application times vary widely, depending upon the substrate 72 and upon the decal carrier 80 and decal 81, but times for maintaining simultaneous heat and vacuum range from the usual times of about one (1) to five (5) minutes, up to as much as ten (10) minutes or more. When the required time of pressure at the desired temperature has been achieved, then the vacuum in the chamber 70 is relieved, and the heating pad 22 is removed from the substrate 72, and the decal carrier 80 discarded, while leaving the decal 81 affixed to the substrate 72.

Also, it is clear from the above description that the control box 24 of the present invention provides a simple visual indication of the time remaining for the decal 81 application process, and which may be easily changed by reprogramming the timer 100. This provision allows the operator to avoid circumstances in which the heating pad 22 is applied for too long or too short of a time period, so that the decal 81 image can be properly adhered to the substrate 72 without overheating and degrading the decal 81.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalences of the claims are therefore intended to be embraced therein.

We claim:

1. An improved apparatus for the application of heat and pressure to a heat sensitive transferable decalcomania to apply the same to a substrate, said apparatus comprising:

(a) a flexible heating pad, said flexible heating pad having a first axis and a second axis, said flexible heating pad displaceably compliant with respect to said first axis and with respect to said second axis, to conformably engage a selected substrate, said flexible heating pad further comprising:

(i) a body, said body comprising a first portion, a second portion having a lower interior side, and a peripheral edge portion;

(ii) a compliant porous skin portion provided adjacent to said lower interior side, (iii) an electric resistance heater, said heater integrally formed within said second portion of said body; and (iv) an annular peripheral sealing lip of deformable material, said sealing lip located adjacent to said peripheral edge portion and adapted to provide sidewalls to form a seal between said flexible heating pad and a substrate and to thereby form a chamber between said substrate and said lower interior side of said second portion of said body;

(v) at least one passageway in said body, said at least one passageway having an exit, said at least one passageway adapted to allow gas to move through said at least one passageway to thereby escape from said chamber when a vacuum is drawn on said exit of said at least one passageway;

(b) a vacuum pump, said vacuum pump adapted to draw a vacuum on said exit of said at least one passageway;

(c) whereby air may be evacuated from said chamber between said flexible heating pad and a substrate, so as to urge said porous skin portion of said flexible heating pad against a transferrable decalcomania, and in turn urge such decalcomania against such substrate.

2. The apparatus as set forth in claim 1, wherein said at least one passageway is in fluid communication (a) with said compliant porous skin portion, and (b) with said vacuum pump, (c) so that when said vacuum pump is engaged, air may be withdrawn through said porous skin portion and thence into said at least one passageway and thence to said vacuum pump, and (d) whereby a vacuum is evenly established and thus pressure evenly applied to said decalcomania by said porous skin portion, so that wrinkles in said decalcomania may be avoided.

3. The apparatus as set forth in claim 1, further comprising
(a) a temperature sensor adapted to detect the temperature of the flexible heating pad; and
(b) a temperature controller, said controller adapted to receive an indication from said temperature sensor, and in response thereto to provide a signal to a device for limiting the electrical input to said electric resistance heater and to thereby regulate the temperature of said flexible heating pad.

4. The apparatus as set forth in claim 1, further comprising a timer, said timer adapted send a signal to a heater control relay to thereby start and stop electrical energy input to said vacuum pump.

5. The apparatus as set forth in claim 4, wherein said timer further comprises a display means for visually displaying the remaining time for application of vacuum.

6. The apparatus as set forth in claim 5, wherein said display means comprises a light emitting diode.

7. The apparatus as set forth in claim 4, wherein said timer further comprises a ten-key type keypad, said timer adapted to receive input from said keypad to preselect a period of time for operation of said vacuum pump.

8. The apparatus as set forth in claim 1, wherein said flexible heating pad is sufficiently flexible such that when brought into operative proximity to a selected substrate, said flexible heating pad is deformable so that said flexible heating pad compliantly conforms substantially to the shape of such substrate.

9. The apparatus of claim 1, wherein said flexible heating pad is provided in a substantially rectangular shape.

10. An improved heating pad for the application of heat and pressure to a heat sensitive transferable decalcomania to apply the same to a substrate, said heating pad, comprising:
(a) a flexible body, said flexible body having a first axis and a second axis, said flexible body displaceably compliant with respect to said first axis and with respect to said second axis to conformably engage a selected substrate, said flexible body comprising a first portion having an exterior upper side, a second portion having a lower interior side, and a peripheral edge portion;
(b) a compliant porous skin portion provided adjacent to said lower interior side;
(c) an electric resistance heater, said heater integrally formed within said second portion of said flexible body; and
(d) an annular peripheral sealing lip of deformable material, said sealing lip located adjacent to said peripheral edge portion and adapted to provide sidewalls to form a seal against said substrate and to thereby form a chamber between said substrate and said lower interior side of said second portion of said body;
(e) at least one passageway in said flexible body, said passageway having an exit, said passageway adapted to allow gas to move through said passageway to thereby escape from said chamber When a vacuum is drawn on said exit of said passageway;
(f) whereby air may be evacuated from said chamber, so as to urge said porous skin portion against a transferrable decalcomania, and in turn urge said decalcomania against such substrate.

11. The apparatus as set forth in claim 10, wherein said heating pad is sufficiently flexible so that said heating pad compliantly conforms substantially to the shape of such substrate.

12. The apparatus as set forth in claim 10, wherein said at least one passageway is in fluid communication with said compliant porous skin portion and with said exit of said at least one passageway.

13. A method for the application of heat and pressure to a heat sensitive transferable decalcomania to apply the same to a substrate, said method comprising:
(a) the step of heating said decalcomania with a heating pad for a predetermined time period,
(i) wherein said heating pad comprises:
(A) a flexible body, said flexible body having a first axis and a second axis, said flexible body displaceably compliant with respect to said first axis and with respect to said second axis to conformably engage a selected substrate, said flexible body comprising a first portion having an exterior upper side, a second portion having a lower interior side, and a peripheral edge portion;
(B) a compliant porous skin portion provided adjacent to said lower interior side;
(C) an electric resistance heater, said heater integrally formed within said second portion of said flexible body; and
(D) an annular peripheral sealing lip of deformable material, said sealing lip located adjacent to said peripheral edge portion and adapted to provide sidewalls to form a seal between said heating pad and a substrate and to thereby form a chamber between said substrate and said lower interior side of said second portion of said flexible body;
(E) at least one passageway in said flexible body, said at least one passageway having an exit, said at least one passageway adapted to allow gas to move through said at least one passageway to thereby escape from said chamber when a vacuum is drawn on said exit of said at least one passageway; and
(ii) wherein said decalcomania is securely positioned between said porous skin portion and said substrate; and
(b) simultaneous with said heating step, the step of drawing a vacuum on said chamber with a vacuum pump, whereby air may be evacuated through said at least one passageway and thus from said chamber, so as to urge said porous skin portion of said heating pad against a transferrable decalcomania, and in turn urge said decalcomania against such substrate;
(c) the step of relieving the vacuum in said chamber; and
(d) the step of removing the heating pad from said substrate, while leaving said decalcomania affixed to said substrate.

14. The method according to claim 13, further comprising
(a) the step of sensing the temperature sensor of said heating pad; and
(b) the step of controlling the temperature of said heating pad by receiving an indication from said temperature sensor, and in response thereto, providing a signal to a device for limiting the electrical input to said electric resistance heater to achieve a preselected temperature in said heating pad.

15. The method as set forth in claim 13, further comprising starting and stopping the operation of said vacuum pump by a timer, said timer adapted send a signal to a control relay to thereby start and stop electrical energy input to said vacuum pump.

16. The method as set forth in claim 15, wherein said timer further comprises a display for visually displaying the remaining time for application of the vacuum.

17. The method as set forth in claim 13, further comprising, before the step of drawing a vacuum on said chamber, the step of deforming said heating pad sufficiently such that when said heating pad is brought into operative proximity to a selected substrate, said heating pad flexibly and compliantly conforms substantially to the shape of such substrate.

18. An improved apparatus for the application of heat and pressure to apply transferable designs to a substrate that has surfaces which are curved, said apparatus comprising:

(a) a flexible heating pad, said heating pad having a first axis and a second axis, said flexible heating pad displaceably compliant with respect to said first axis and with respect to said second axis, to conformably engage a selected substrate, said flexible heating pad further comprising:

(i) a body, said body comprising a first portion having an exterior upper side, a second portion having a lower interior side, and a peripheral edge portion;

(ii) a compliant porous skin portion provided adjacent to said lower interior side, (iii) an electric resistance heater, said heater integrally formed within said second portion of said body; and (iv) an annular peripheral sealing lip of deformable material, said sealing lip located adjacent to said peripheral edge portion and adapted to provide sidewalls to form a seal between said heating pad and a substrate and to thereby form a chamber between said substrate and said lower compliant skin portion of said body;

(v) at least one passageway in said body, said passageway having an exit, said passageway adapted to allow gas to move through said passageway to thereby escape from said chamber when a vacuum is drawn on said exit of said passageway;

(b) a vacuum means, said vacuum means adapted to draw a vacuum on said exit of said passageway, whereby air may be evacuated from said chamber between the heating pad and the substrate, so as to urge said porous skin portion of said heating pad against a transferrable decalcomania, and in turn urge said decalcomania against such substrate; and (c) control means operatively connected with said flexible heating pad and said vacuum means, said control means adapted (i) to control the time of application of a vacuum to said chamber, and (ii) to control the electrical supply to said electrical resistance heater in response indications of temperature of said heating pad, to thereby maintain a predetermined temperature in said heating pad.

* * * * *